United States Patent [19]
Brunet et al.

[11] Patent Number: 4,856,677
[45] Date of Patent: Aug. 15, 1989

[54] PORTIONING DEVICE FOR PASTE OR SEMI-LIQUID PRODUCTS

[75] Inventors: Michel Brunet, Sainte Colombe La Commanderie; Claude Jouillat, Montigny Sur Avre, both of France

[73] Assignee: Valois, Societe Anonyme, Le Neubourg, France

[21] Appl. No.: 86,458

[22] Filed: Aug. 18, 1987

[30] Foreign Application Priority Data
Mar. 26, 1987 [FR] France ............................. 87 04211

[51] Int. Cl.⁴ .......................................... B67D 5/40
[52] U.S. Cl. .................................... 222/94; 222/96; 222/321; 222/385
[58] Field of Search ............. 222/95, 96, 94, 321, 222/383, 385, 424.5

[56] References Cited

U.S. PATENT DOCUMENTS

| | | | |
|---|---|---|---|
| 1,975,545 | 10/1934 | Homewood et al. | 222/424.5 X |
| 2,096,397 | 10/1937 | Harris | 222/95 |
| 2,620,943 | 12/1952 | Critelli et al. | 222/95 |
| 3,211,340 | 10/1965 | Zander et al. | 222/95 |
| 3,335,913 | 8/1967 | Bouet | 222/95 |
| 4,120,429 | 10/1978 | Vignot | 222/321 X |

FOREIGN PATENT DOCUMENTS

| | | |
|---|---|---|
| 819094 | 10/1937 | France . |
| 2305241 | 10/1976 | France . |
| 2343137 | 9/1977 | France . |

Primary Examiner—Joseph J. Rolla
Assistant Examiner—Gregory L. Huson
Attorney, Agent, or Firm—Sughrue, Mion, Zinn, Macpeak and Seas

[57] ABSTRACT

The object of the invention is a combination of a portioning system and a flexible tube to contain and distribute a paste product or a cream. By pressing on the flexible tube, the system can be completely filled. Exact portions of the product can be obtained and the product is not exposed to the air, does not dry out and is not contaminated.

2 Claims, 4 Drawing Sheets

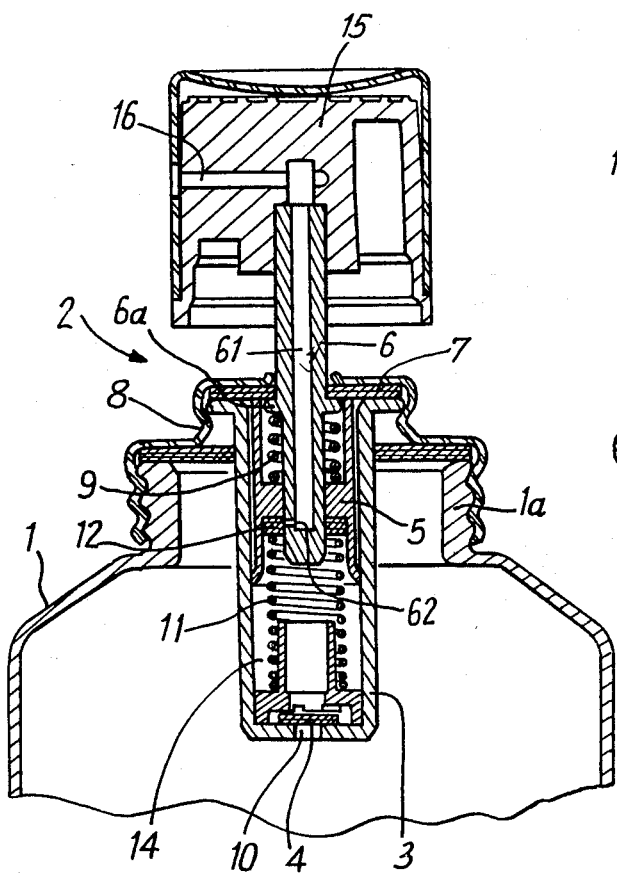
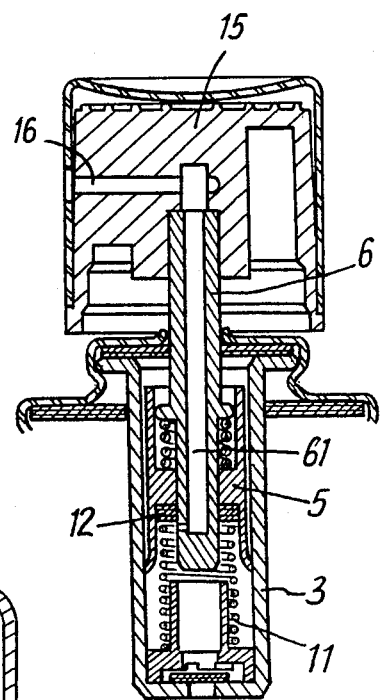

PORTIONING DEVICE FOR PASTE OR SEMI-LIQUID PRODUCTS

BACKGROUND OF THE INVENTION

1. Field of the Invention

The object of the present invention is a portioning device for paste or semi-liquid products, contained in a flexible metal or plastics material tube, of the toothpaste tube type, which is squeezed to extract the contents.

2. Description of the Prior Art

Devices are known of the type described in French patent No. 2 240 161. These devices comprise a portioning stopper mounted on a double-walled receptacle consisting of a flexible receptacle housed inside a rigid outer receptacle. There exist other portioning systems mounted on tubes, the bottoms of which consist of a piston which rises as the tube empties. However there is no portioning device which can be mounted simply and directly on a hand held flexible tube, the contents of which are extracted by pressure.

Various portioning stopper systems or systems with pumps fitted to receptacles are also known (French patent No. 819 094). Although this patent describes an application for cream, if the product to be discharged is a little thick, operation is defective and portioning inexact. Systems are also known in which a pump is fitted to a bottle (French patent Nos. 2 343 137 and 2 305 241). It is also known to make stoppers including a built-in portioning device for bottles intended to cotnain a liquid. French patent application No. 2 562 444 describes such a device, wherein the volume of liquid to be portioned can be controlled at will simply by moving one side of a measuring vessel disposed in the rotating part of a faucet pipe. Movement of said side is effected by screwing (or unscrewing) a worm, against a graduated rule. When the volume of the vessel is regulated and the rotating part of the faucet pipe appropriately positioned, the bottle and the stopper are simply tilted downwards to fill the measuring vessel and the rotating part is then turned a quarter of a turn to empty said vessel.

Although these systems are suitable for portioning liquids, they cannot be used to portion a paste or even a semi-liquid product. The transfer of the liquid from the bottle into the measuring vessel and from the measuring vessel into the receptacle in which the portioned volume is collected is effected by gravity. Now, through its very nature, a paste or semi-liquid product does not flow or flows poorly. In addition, whereas with a liquid there is no risk of forming deposits likely to dry out and partly or totally clog a discharge conduit or orifice, the same does not apply with a paste product.

Consequently, if it is wished to equip a receptacle intended to contain a past or semi-liquid product with a portioning stopper, it is necessary to address the problems posed by transferring said product from the inside to the outside of the receptacle, and by the formation of deposits of the product in the transfer channels of said portioning stopper.

An object of the present invention is precisely a reliable combination providing a solution to the specific difficulties linked to the portioning of paste or semi-liquid products.

SUMMARY OF THE INVENTION

According to the present invention, the use of a portioning device is combined with a receptacle consisting of a flexible tube (of the toothpaste tube type).

According to the present invention, a portioning device or stopper of the pump type, comprising a pump casing with a piston which moves between two positions within the pump casing, a closable suction orifice, a closable delivery orifice and a pushbutton to control the movement of the piston, is combined on a tube of the toothpaste tube type. Thus, the user, by pressing the tube, can fill the portioning chamber and by pressing on the pushbutton, release a defined portion of the product contained in the tube. If the product is sufficiently fluid, the portioning chamber can be filled simply by suction of the pump, without having to squeeze the tube which gradually flattens under the effect of atmospheric pressure.

According to an advantageous aspect of the present invention, opening of at least one of the closable orifices is controlled by actuating the pushbutton. In one embodiment, the closable delivery orifice is of the slide type. In another embodiment, the pump is the of the precompression type, the delivery orifice being held closed by a spring, so that this orifice can be opened only if the pressure in the pump casing exceeds a given threshold, such that this pressure is difficult to achieve by squeezing the tube, but can be achieved without difficulty by actuating the pushbutton. The closable orifices can be valves as well as orifices the closing of which is controlled by a slide.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 1 is a view in cross-section of an assembly consisting of a flexible tube and a portioning device in accordance with the present invention in the rest position.

FIG. 2 is a view of the same assembly in an intermediate position.

DESCRIPTION OF THE PREFERRED EMBODIMENTS

Figure 3:
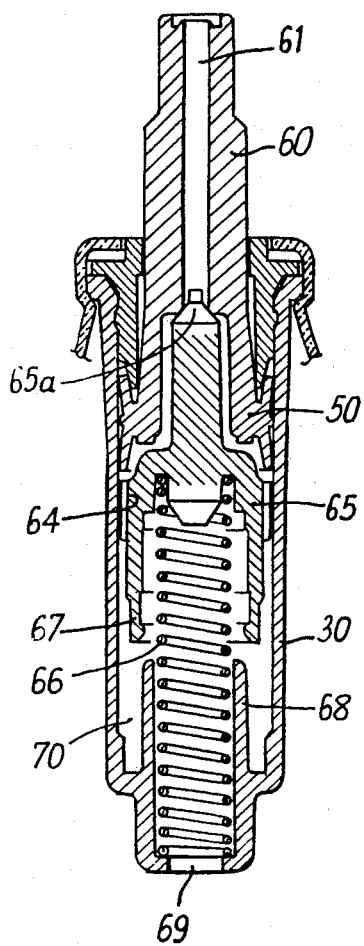
FIG. 3 is a view similar to FIG. 1 for a variant.

The device according to the invention associates various pumps of known types with flexible tubes, and a preferred embodiment is a portioning device which can be associated with a flexible tube.

The device shown in cross-section in FIGS. 1 and 2 consists of a flexible tube 1, of the toothpaste tube type, made of metal (aluminum) or plastics material. This tube contains a paste product, a cream, an oil or even a liquid product. A portioning device of the pump type 2 is screw mounted on the threaded end 1A of this tube. This device (known in itself, for example of the type described in French patent No. 2 343 137) comprises a pump casing 3 closed at the bottom by a free moving valve 4, closing an opening 10 formed at the bottom of the pump casing. In the casing 3, is disposed a piston 5 which can slide in the casing providing a seal along the inner wall of the casing. The piston is slide mounted on a rod 6 formed with a flange 6A presenting a step in the upwards and downwards directions. In the upward direction, the flange 6A rests against an annular seal 7, held against the top opening of the pump casing by a capsule 8 crimped over a rim of the casing, the outer edge of which forms a screw pitch adapted to the threaded end 1A of the tube 1. Against the bottom of the flange 6A rests one end of a spring 9, the other end of which rests against the top of the piston 5. A return spring 11, housed in the lower part of the pump casing, rests at its lower end against the bottom of the pump casing, and at its upper end against the bottom of the piston 5. The rod 6 comprises a central channel 61, open at the upper end of the rod 6 and closed at the lower end. A radial channel 62 provides communication between the channel 61 and the outside of the rod at a level immediately below the piston 5 when the piston is in the upper position, that is when the top of the piston is resting against the seal 7. An annular seal 12 is positioned below the piston 5 so as to close the channel 62. In the idle position, the spring 11 exerts a force stronger than that exerted by the spring 9. Consequently, the spring 11 pushes the piston 5 upwards against the seal 7, and through the spring 9 it also pushes the flange 6A against the seal 7. With the piston 5, the lower part of the pump casing delimits a portioning chamber 14. The upper end of the rod 6 is capped with a pushbutton 15 incorporating a discharge channel 16 providing communication between the channel 61 and the outside, to discharge the product contained in the tube 1.

The device works in the following manner. Pressing the pushbutton 15 causes the rod 6 to be lowered, and said rod through the effect of the flange 6a and the spring 9 causes the piston 5 to move downwards. The product contained in the chamber 14 is compressed and closes the valve 4. The pressure rises in the chamber 14 which prevents the piston from moving down further. With continued pressure on the pushbutton 15, the rod 6 continues to go down and the orifice of the channel 62 is opened below the seal 12. The product in the chamber 9 then escapes under the pressure, through the channel 62, the channel 61 and the channel 16, to the outside (see FIG. 2). When the bottom of the piston 5 reaches the bottom of the pump casing, the movement is halted and a portion of product has been expelled to the outside through the channel 16. When the pushbutton 15 is released, the spring 11 pushes back the piston 5 and the rod 6 to the idle position. This movement sucks the product out of the tube 1 through the valve 4 which lifts. Manually pressing the tube 1 facilitates the filling (or priming) of the chamber 14. It will be noticed that the pressure exerted on the tube cannot cause the product to leave the portioning device, because pressurization in the chamber 14 in the idle state presses the piston and the flange 6a against the seal 7. Said seal can in no case uncover the orifice of the channel 62 which remains closed. Opening of the outlet channel of the pump 2 is controlled by actuating the pushbutton 15. If this button is not actuated, nothing can leave the portioning chamber. Such a system operates without the product coming into contact with the air, the product thus being preserved from pollution and not drying out. This operation differs from the normal operation of a pump in which the expelled volume is normally replaced by air.

FIG. 3 is a view corresponding to FIG. 1 with another type of portioning device.

With a view to simplification, the tube 1 is not shown. This portioning device (also known in itself, for example of the type described in French patent No. 2 305 241) comprises a pump casing in which an annular piston 50 is slide mounted, attached to a hollow rod 60 with a central channel 61. In the pump casing, below the piston 50 is mounted a valve 65, the top 65a of which forms a needle closing the channel 61 when it is pulled upwards by a spring 66, the upper end of which rests under the valve, with its lower end on the bottom of the pump casing. The valve can slide in the pump casing, and can be guided by ribs 64 leaving free the space between them. The valve 65 is extended downwards by a skirt 67. A cylinder 68 is fixed vertically and axially to the bottom of the pump casing. This bottom comprises an opening 69 in the axis of the cylinder 68. The diameters of the skirt 67 and of the cylinder 68 are selected to be different so that one can fit into the other to provide a seal.

When the rod 60 is pressed, it moves downwards, pushing the valve 65. The skirt 67 comes on top of the cylinder 68 which closes and delimits a portioning chamber 70. By continuing to move the rod 60 downwards, the pressure increase in the chamber 70 detaches the valve from the piston against the force of the spring, which brings the channel 61 into communication with the chamber 70.

Unlike the previous device, it is the controlled movement of the piston which closes the pump's suction valve. But the delivery valve (needle 65a) can open only under the effect of sufficient pressure, which, in practise, can be obtained only by exerting sufficient pressure on the pushbutton when the portioning chamber is closed. This version presents the advantage of having a clear path for the passage of the product, which is advantageous for the distribution of a paste product. As in the previous example, the product does not come into contact with the air.

Figure 4:
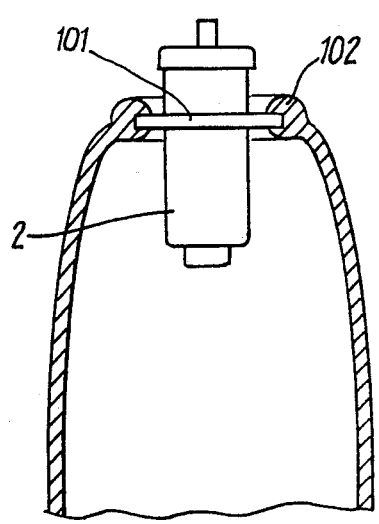
FIG. 4 is a view in elevation with a partial cross-section of a method of linking a portioning device with a flexible tube.

In the proposed embodiments, the portioning device is screw mounted onto the flexible tube. In this way, the portioning device can be fitted to any flexible tube. It is also possible (FIG. 4) to mold a plastic tube onto a plastic portioning device. The pump casing 2 of the portioning device includes a collar 101 for this purpose. The molding is effected with flange 102, molded in a single piece with the tube 1. This is then filled and closed by welding. Any portioning device can be used provided that it is fitted with a plastic collar which can be secured by molding.

Figure 5:
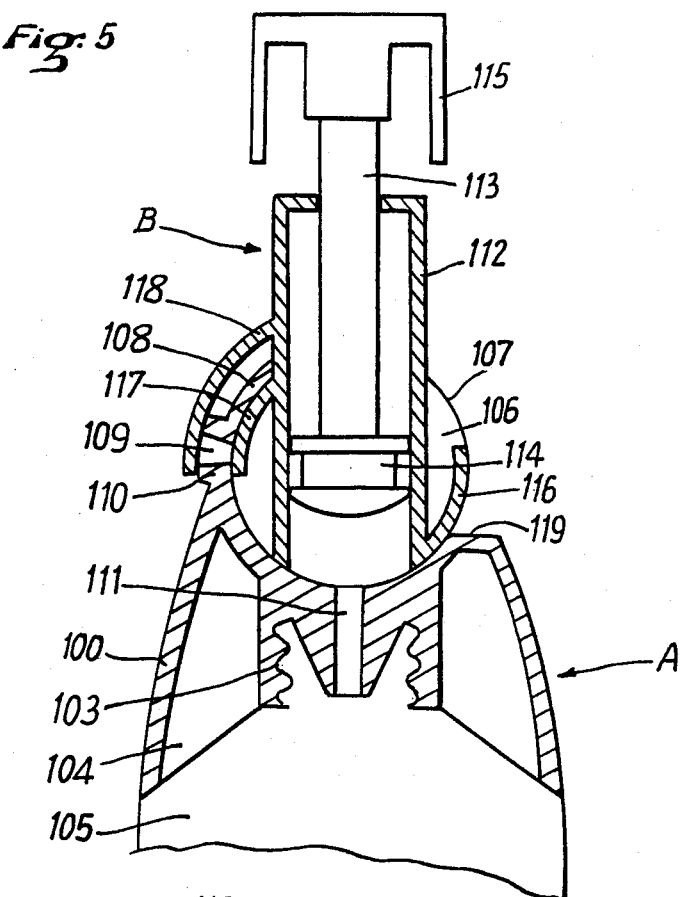
FIG. 5 is a view in median cross-section of another method of associating a flexible tube with a portioning stopper in accordance with the invention, the portioning chamber being in the filling position.
Figure 6:
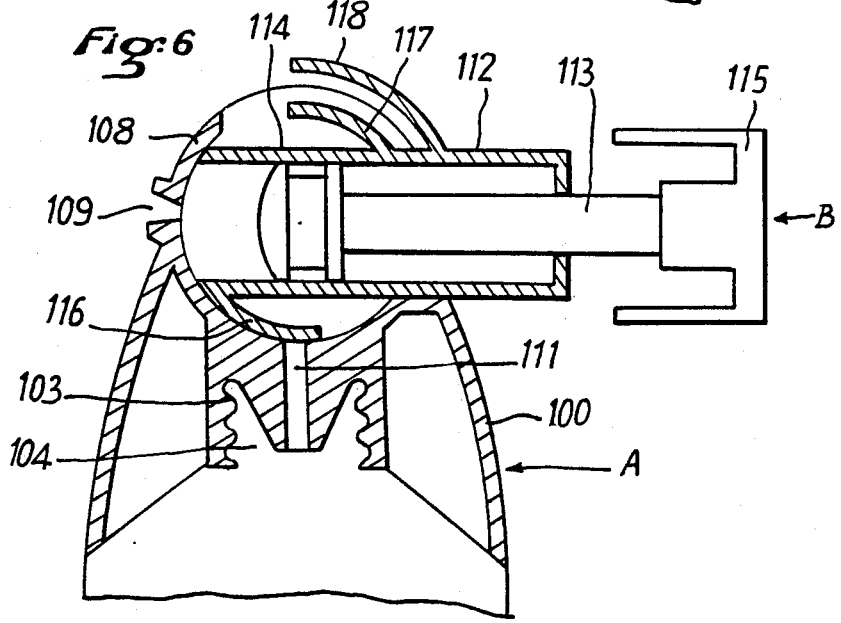
FIG. 6 is a view in median cross-section of the portioning stopper in FIG. 5, the portioning chamber being in the discharge position.

The portioning stopper shown in FIGS. 5 and 6 (known in itself, for example of the type described in French patent No. 819 094) comprises a fixed cap A and a mobile portioning button B which can rotate with respect to said fixed cap by approximately 90° for example. The cap A comprises a casing 100, in the form of a truncated ogive or cone for example, fitted with an axial thread 103 intended to cooperate with the threaded neck 104 of the tube 105 of the type of an ointment or toothpaste tube in aluminum or flexible plastics material. The cap A also comprises a cylindrical or spherical recess 106 between two circular flanges 107 connected on part of their circumference by a curved wall 108. Each of the flanges 107 presents at the center of its inner surface a projection of the fillister type to cooperate with a corresponding housing on the portioning device pushbutton B, these projections and these housings constituting the hinging mechanism (not shown) of the portioning stopper. The wall 108 has a discharge hole 109 advantageously tapered, the vertex of the cone being inside the recess 106. The discharge hole 109 is extended outwards by an annular projection 110. A channel 111 ending at the level of the neck 104 provides communication between the tube 1 and the recess 106.

The portioning device pushbutton B comprises a cylinder 112 one end of which is closed and contains a hole for the passage of the rod 113 of a piston 114, the head of which is curved and reproduces the inner surface of the recess 106. The end of the rod 113 opposite to the piston 114 receives a pushbutton 115. To the cylinder 112 are secured three tabs 116, 117, 118 having the form of a portion of a cylindrical or spherical ring (in practice, the cylinder 112 and the tabs 116, 117, 118 are molded in a single piece). The tabs 116 and 117 are disposed on the same circumference and their outer diameter is equal to the diameter of the recess 106. The respective lengths of the tabs 116 and 117 are such that, when the axis of the cylinder 112 and the longitudinal axis of the receptacle 105 coincide (figure 5, filling position of the cylinder 112), the tab 117 closes the inner orifice of the discharge hole 109 and, when these two axes approximately form a right angle for example (FIG. 6, discharge position of the cylinder 112), the tab 116 closes the channel 111. Thus, the tabs 116 and 117 have a dual function: firstly they cooperate with the recess 106, enabling rotation of the portioning device pushbutton B with respect to the cap A; secondly they are of sufficient length to close or uncover one of the orifices of the channel 111 or the discharge hole 109, according to the respective positions of the portioning device pushbutton B and the cap A. The rotation of the portioning device pushbutton 102 with respect to the cap 100, which is a maximum of approximately 90° for example, is limited between two extreme positions, the cylinder 112 being stopped against the curved wall 108 in one case and against a stopping surface 119 of the casing 100 in the other case. The tab 118 is concentric with the tabs 116, 118 and its length and inner diameter are such that, when the cylinder 112 is stopped against the curved wall 108, it closes the orifice of the annular projection 110.

The tube-portioning device stopper system described above works in the following manner. To measure a portion of the paste or semi-liquid product contained in the tube 1 (said portion being equal to the internal volume of the cylinder 112), the portioning device pushbutton B is placed in the position indicated in FIG. 5. The channel 111 is then open. The tube 1 is pressed, which causes the product to be moved from the tube 1 into the cylinder 112 and the piston 114 to move upwards. When the piston 114 reaches its upper stop position, the portion of product is measured and is then obtained simply by turning the portioning device pushbutton B approximately a quarter of a turn for example, in the position indicated on FIG. 6. The channel 111 is then closed and the discharge hole 109 open. The pushbutton 115 is pressed and the product is obtained at the level of the annular projection 110, expelled by the piston 114. When the operation is complete, the portioning device pushbutton B is again turned and the tabs 117, 118 respectively close the inner and outer orifices of the discharge hole 109. The product which is imprisoned is therefore out of contact with the air, does not dry out and does not form a deposit. It will be expelled at the next operation.

Figure 7:
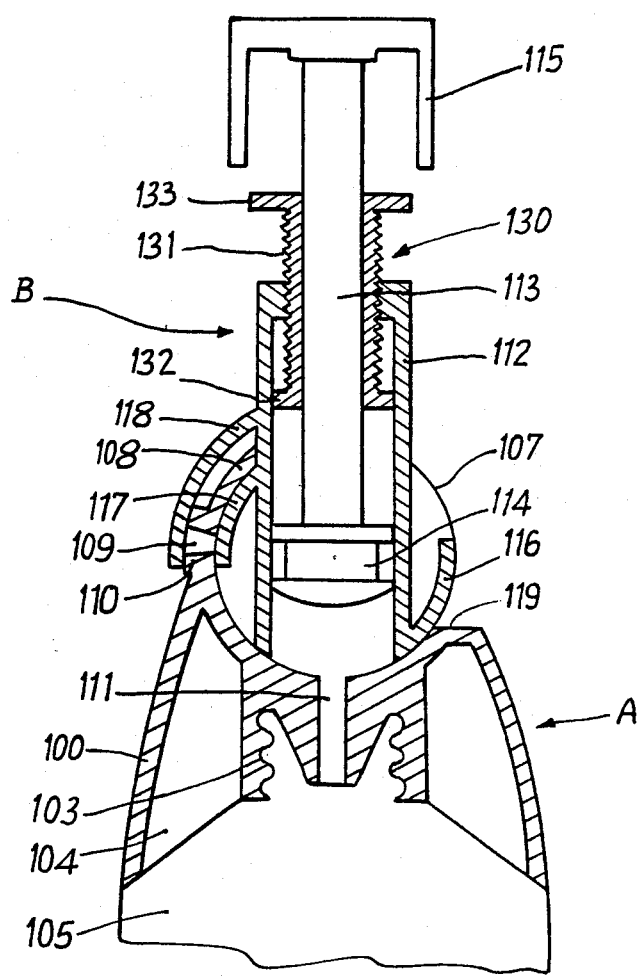
FIG. 7 is a view in median cross-section of a portioning device of the type shown in FIG. 5, comprising a portion adjustment device.

FIG. 7 shows a tube-portioning stopper assembly according to the invention, which, different from the embodiment described previously, comprises a portion adjustment device 130. This adjustment device 130 comprises a cylindrical sleeve 131 the outer surface of which is threaded and cooperates with the thread of a hole made in the upper end of the cylinder 112. The adjustment device 130 also comprises, at the end of the sleeve 131 inside the cylinder 112, a circular shoulder 132 of diameter equal to that of the cylinder 112, and at the end of the sleeve outside the cylinder 112, a collar 133 the periphery of which advantageously comprises axial ribs or milling. The inner surface of the sleeve 131 serves to guide the rod 113 of the piston.

By turning the collar 133 forwards or backwards the sleeve 131 is caused to rise or fall in the cylinder 112, and consequently, the shoulder 132 against which the base of the piston 114 is stopped when it is in its uppermost position, also rises or falls. Using the collar 133, the travel of the piston 114 is therefore modified, thus adjusting the volume of the portion to be measured. Maximum depression of the sleeve 131 corresponds to the minimum portion and minimum depression to the maximum portion. According to the nature of the product which is to be variably portioned, the height of the sleeve 131 is calculated for the maximum and minimum prescribable portions.

As a variant, it is possible to use a portion adjustment system such as that described in French patent No. 819 094. The piston rod comprises a projecting part and according to the direction of the rod which can rotate on itself, cooperates with stops in different planes.

In all these devices, the product contained in the tube is prevented from being contaminated by the air (because it does not come into contact with the air and is sealed in all cases), and the assembly can be used in any position. The possibility of exerting manual pressure on the tube facilitates priming, and renders it possible in all cases. This also facilitates filling the portioning chamber. Portioning avoids wasting the product.

It will be understood that various changes in the details, materials and arrangements of parts, which have been herein described and illustrated in order to explain the nature of the invention, may be made by those skilled in the art within the principle and scope of the invention as expressed in the appended claims.

There is claimed:

1. A portioning device for dispensing paste or semi-liquid products, comprising in combination: a flexible, collapsible, externally accessible metal or plastics tube containing a supply of the product to be dispensed, and a portioning system of the pump type sealingly mounted to a mouth of the tube such that the product does not come into contact with air, and comprising a pump casing (30) defining a portioning chamber (70), a piston (50) slidably disposed within the pump casing for movement between a depressed position and a rest position, the piston being biased towards the rest position by a return spring (66), a closable suction orifice (69), a closable delivery orifice (61), and a push button (15) for controlling the movement of the piston through the intermediary of an actuating rod (60), the filling of the pump casing chamber being effected at least in part by manually squeezing the tube, and the discharge of the chamber being effected by depressing the push button, wherein the pump is of the precompression type, the closable delivery orifice extends through the piston and inside the actuating rod, and further comprising a valve (65) slidably disposed within the portioning chamber between the return spring and the piston for closing the delivery orifice under the biasing of said spring, said valve being opened when the pressure in the pump casing exceeds a predetermined threshold established by the spring.

2. A portioning device for dispensing paste or semi-liquid products, comprising in combination: a flexible, collapsible, externally accessible metal or plastics tube containing a supply of the product to be dispensed, and a portioning system of the pump type sealing mounted to a mouth of the tube such that the product does not come into contact with air, and comprising a pump casing (3) defining a portioning chamber (14), a piston (5) slidably disposed within the pump casing for movement between a depressed position and a rest position, the piston being biased towards the rest position by a return spring (11), a closable suction orifice (4), a closable delivery orifice (61), and a push button (15) for controlling the movement of the piston through the intermediary of an actuating rod (6), the filling of the pump casing chamber being effected at least in part by manually squeezing the tube, and the discharge of the chamber being effected by depressing the push button, wherein the pump is of the finger actuated precompression type, the piston is slidably mounted on the actuating rod for a predetermined range of idle travel, and the closable delivery orifice is formed by an orifice (62) in the actuating rod which can be opened by the movement of the piston away therefrom.

* * * * *